United States Patent [19]

Emmett, Jr.

[11] 4,055,494
[45] Oct. 25, 1977

[54] THICKENING DEVICE AND METHOD

[75] Inventor: Robert C. Emmett, Jr., Salt Lake City, Utah

[73] Assignee: Envirotech Corporation, Menlo Park, Calif.

[21] Appl. No.: 768,315

[22] Filed: Feb. 14, 1977

[51] Int. Cl.² .................... C02B 1/20; C02C 5/02; B01D 21/01
[52] U.S. Cl. ................................ 210/49; 210/61; 210/84; 210/199; 210/208; 210/519
[58] Field of Search ................ 210/49, 83, 84, 207, 210/208, 519, 520, 61, 199, 42 R

[56] References Cited

U.S. PATENT DOCUMENTS

| | | | |
|---|---|---|---|
| 1,030,366 | 6/1912 | Winters | 210/207 |
| 1,400,622 | 2/1920 | Nordell | 210/84 |
| 1,940,585 | 12/1933 | Fauth | 210/199 |
| 2,151,261 | 3/1939 | Bartlett | 210/199 |
| 2,274,361 | 2/1942 | Darby | 210/42 R |
| 2,295,714 | 9/1942 | Clark | 210/208 |
| 2,440,514 | 4/1948 | Karlstrom | 210/199 |
| 2,678,730 | 5/1954 | Coulter | 210/84 |
| 2,881,922 | 4/1959 | Kelly | 210/520 |
| 3,006,474 | 10/1961 | Fitch | 210/84 |
| 3,314,527 | 4/1967 | Kivall | 210/520 |
| 3,338,827 | 8/1967 | Mavsolt | 210/49 |
| 3,349,030 | 10/1947 | Savage | 210/49 |
| 3,460,678 | 8/1969 | Condolios | 210/520 |
| 3,482,704 | 12/1969 | Jablon | 210/519 |
| 3,532,218 | 10/1970 | Von Blottnitz | 210/207 |
| 3,545,620 | 12/1970 | Thorn | 210/208 |
| 3,660,284 | 5/1972 | Camp | 210/49 |
| 3,779,910 | 12/1973 | Chatfield | 210/208 |
| 3,892,666 | 7/1975 | Quast | 210/520 |

FOREIGN PATENT DOCUMENTS 589,628  6/1947  United Kingdom .................. 210/84

Primary Examiner—Wilbur L. Bascomb, Jr.
Assistant Examiner—Ernest G. Therkorn
Attorney, Agent, or Firm—R. E. Krebs; H. J. Bohner

[57] ABSTRACT

A machine is disclosed for separating solids from feed liquor by gravity settling to form thickened subnatant. The machine includes a liquid-holding tank having an upstanding tubular column mounted therein for receiving the feed liquor. An inlet is formed in the upper portion of the column to admit clarified supernatant into the column for mixing with, and dilution of, the feed liquor. A plurality of subadjacent compartments include reagent introduction and mixing means to receive the feed liquor and to mix a chemical flocculating reagent thereinto. At the bottom of the column is an outlet to discharge the flocculated liquor directly into a pulp blanket stratum established within the tank.

21 Claims, 3 Drawing Figures

THICKENING DEVICE AND METHOD

BACKGROUND OF THE INVENTION

1. Field of the Invention

The present invention relates generally to gravitational separation by sedimentation and, more particularly, to ways and means for continuously separating suspended solid materials from a feed stream liquor by gravity settling.

2. State of the Art

Sedimentation devices which incorporate liquid-holding tanks are well known to separate suspended solids from streams of liquid, such as water and wastewater, by gravity settling. To hasten separation, it is well known to employ various chemical flocculating reagents. When added to the influent liquor, the reagents combine with the suspended solids to form rapidly settable aggregates, called floc. Typically, the mixing of flocculating reagents with feed slurry is accomplished outside the sedimentation tank proper, say in a flowing pipeline or launder and, in the case of dilute suspensions (say, less than 0.1%), may be accompanied by a mechanical stirring of the feed liquid to provide contact opportunity and time for the resulting flocs to grow. In some cases where the feed solids concentration is high, say 20% to 30% by weight, it is of known benefit to dilute the feed slurry in order to improve flocculation and, thereby, sedimentation; in known machines, this is accomplished outside the sedimentation tank proper.

Sedimentation devices are termed "clarifiers" or "thickeners" depending upon whether they operate upon liquid streams having relatively low or high concentrations of suspended solids and/or whether the primary objective is a clear overflow or a dense, concentrated underflow (in some cases both conditions may be required of a thickener). As used herein, the term "sedimentation device" refers primarily to thickeners and similar continuously-operating gravity settling devices.

OBJECTS OF THE INVENTION

A primary object of the present invention is to provide an improved sedimentation machine for treating mineral slurries, industrial wastes and sewage, and the like, where the sedimentation device has the capacity to handle high flow rates of influent liquor per unit volume of the liquid-holding tank while still providing good clarity in the supernatant liquid. Slurries of finely divided solids which the sedimentation machine of the invention is intended to treat include, for example, ore slurries, pulp and paper recausticizing slurries, flue gas scrubbing slurries, coal refuse slurries, and municipal and industrial wastewaters.

Another object of the present invention is to provide a thickening machine for the purposes described above which operates effectively without recycling or recirculating thickened solids.

BRIEF DESCRIPTION OF THE DRAWINGS

The foregoing and other subjects and advantages of the present invention can be readily ascertained from the following detailed description and appended drawings, which are offered by way of example only and not in limitation of the invention, the scope of which is defined by the appended claims and equivalents. In the drawings:

DETAILED DESCRIPTION OF THE PREFERRED EMBODIMENT

Figure 1:
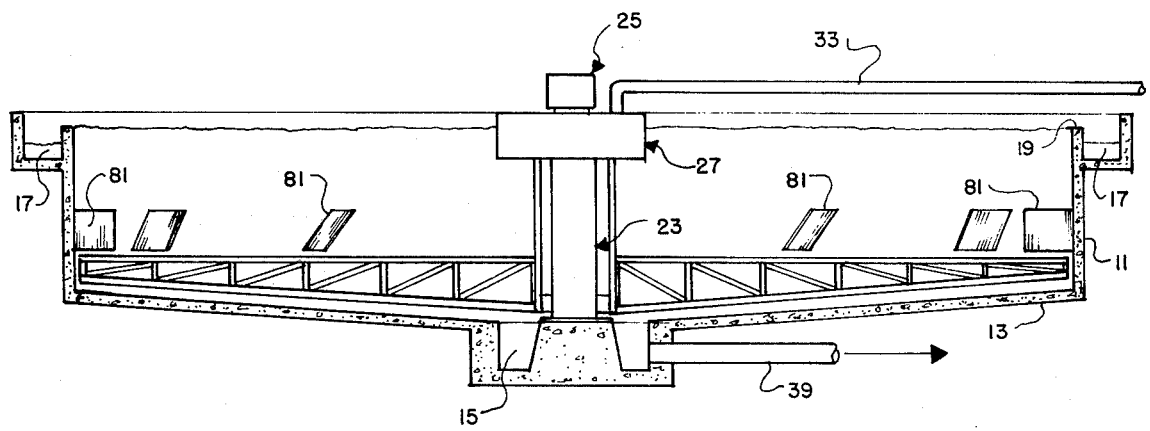
FIG. 1 is a cross-sectional view of a machine in accordance with the present invention, parts of which are shown schematically.
Figure 2:
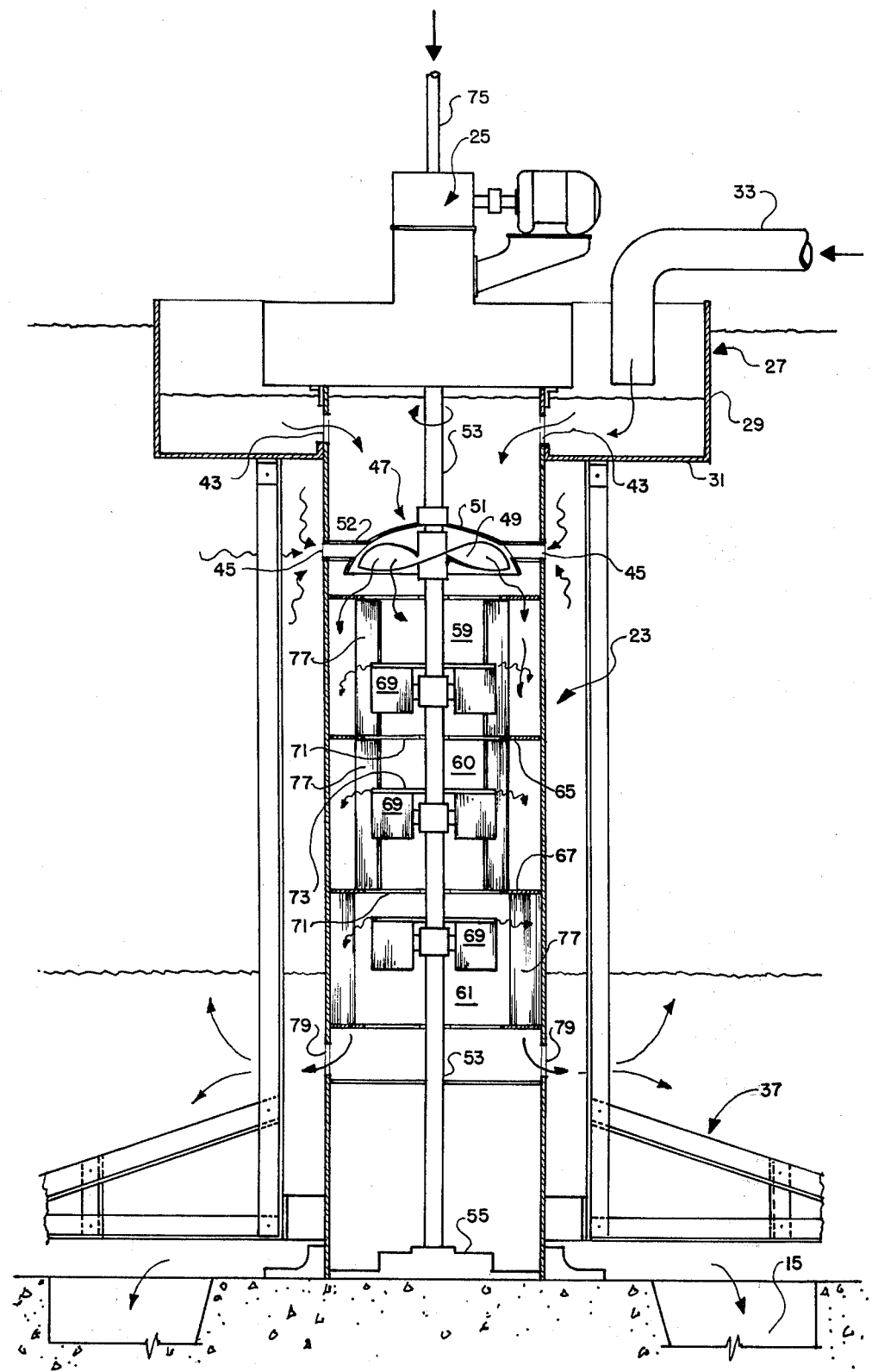
FIG. 2 is a cross-sectional detail, enlarged for purposes of clarity, of a portion of the mechanism in FIG. 1.

The sedimentation machine in FIGS. 1 and 2 includes a liquid-holding tank which is typically circular in configuration and is defined by a marginal upstanding sidewall 11 and a bottom wall 13, the latter which slopes downward toward a sump 15 formed centrally in the bottom wall of the tank. Mounted peripherally about the sidewall 11 is a launder 17 inclusive of an overflow weir wall 19 which defines the liquid level in the tank. Centrally disposed in the tank is an upstanding tubular column 23. The tubular column can be either stationarily supported from the tank floor as shown or can be suspended for rotation from a bridge or other trusswork which traverses the tank.

Further with regard to the embodiment shown in FIGS. 1 and 2, drive unit 25 of conventional construction is mounted atop the stationary center column 23. Below the drive unit and supported therefrom is an annular feedwell 27 which concentrically surrounds the center column. The annular feedwell comprises a cylindrical baffle wall 29 and an annular bottom wall 31 which is in sealing engagement with the column 23. Further, the annular feedwell 27 is coupled by conventional structural means, not shown, to the drive unit 25 to be driven thereby in rotation about the center column. A conduit 33 is mounted to convey a stream of feed liquor containing suspended solids into the feedwell.

As also shown in FIGS. 1 and 2, a raking mechanism 37 of conventional construction is mounted to be driven in rotation about the column 23 by the drive unit 25 and is arranged to rake thickened solids across the bottom or floor 13 of the tank. In the illustrated embodiment, the raking mechanism 37 should be understood to be fixedly connected to the feedwell 27 which, in turn, is connected to the drive unit 25 for rotation. Also in the illustrated embodiment, the raking mechanism 37 should be understood to be disposed to urge settled (thickened) solids towards the aforementioned sump 15 formed about the base of the column 23. From the sump 15, the thickened solids are pumped to discharge via an underflow conduit 39.

Concomitant with the removal of thickened, settled solids via the sump 15, clarified supernatant spills over the weir wall 19 and is carried to discharge via the launder 17. This is, of course, a conventional arrangement well known in the sedimentation art.

With reference now particularly to FIG. 2, at least one port 43 is formed through the sidewall of the column 23 in liquid flow communication with the interior of the feedwell 27. By means of this port 43, a stream of feed liquor is fed into the interior of the column 23. Thus, it can be understood that feedwell 27 differs from the conventional in that it feeds feed liquor inwardly, not outwardly. It should also be understood that alternative means can be provided to introduce liquor into the tubular column; for example, the feed liquor could be introduced into the tubular column through a central opening in an annular drive gear which operates the raking mechanism.

Below the feedwell 27 there is formed at least one port 45 through the sidewall of the tubular column 23. Port 45 is called the dilution port because it is in liquid flow communication with a clarified liquid zone or stratum in the liquid-holding tank, which stratum contains a relatively low percentage of suspended solids. The clarified liquid (supernatant) conveyed through the dilution port 45 serves to dilute the above-mentioned feed stream. In practice, a pump or impeller means 47 is mounted within the column 23 to draw a stream of the dilution liquid through the port 45 and then to impel the liquid downward for mixing with the feed stream. The illustrated pump means 47 includes an impeller 49 mounted within a bell-like housing 51 and coupled to a drive shaft 53 for rotation therewith. The upper end of the drive shaft 53 is coupled to the aforementioned drive unit 25 or to an auxiliary rotary drive; the lower end of the drive shaft 53 is mounted in a bearing means 55, but other support means could be provided. The interior of the bell-like housing 51 is in liquid flow communication with dilution port 45 via a pipe member 52, thus providing an internal recycle. The term internal recycle is intended to convey the concept that dilution of the feed liquor with clarified supernatant is accomplished within the thickening machine itself and without removing supernatant therefrom. The dimensions of the bell-like housing 51 are such that the feed stream liquor can flow downward around the periphery of the housing and thus into the column 23 below the pumping means 47 for mixing with the dilution liquid. As an alternative, a single axial flow impeller having a diameter less than that of the column 23 can be employed to provide the necessary downward pumping, thus eliminating the need for the housing 51.

It should be appreciated that the pumping means 47 is normally necessary because the hydrostatic head imposed by the tank contents plus the hydraulic head loss due to the flowing feed liquor through the column 23 can result in the liquid level within the column exceeding the liquid level outside the column. But for the pumping means in such instances, the excess head in the column would force liquid out of the dilution port 45. In practice, the dilution ratio is selectively adjustable by either varying the pumping rate directly or by changing the area of the dilution port by an adjustable gate means, not shown. One typical example of dilution occurs in the processing of uranium-bearing minerals where slurries of such minerals having solids concentration above about 20% are normally diluted down to about 10% in order to provide improved flocculation and settling. On the other hand, in some applications where the feed solids concentration is initially low, good flocculation can be achieved without dilution and, hence, the dilution step can be omitted together with the aforedescribed structure to accomplish the same.

Formed within the tubular column 23 below the dilution streat entry ports 45 are a plurality of subadjacent flocculating-mixing compartments or stages 59–61 which sequentially receive the diluted feed liquor. Since the three illustrated stages are generally the same, only stage 60 will now be described in detail. The roof and floor of the stage 60 are defined by annular baffle plates 65 and 67, respectively, which are fixed horizontally to the interior wall of the tubular column. The center openings 71 in the annular baffle plates 65 and 67 are of sufficient size to accomodate the aforementioned drive shaft 53 as well as to permit the flow of diluted feed liquor into and then out of the flocculating-mixing stage 60. Although other means could be provided to convey the diluted feed liquor sequentially to and from the flocculating-mixing stages, the illustrated embodiment is preferred because of its structural simplicity.

Figure 3:
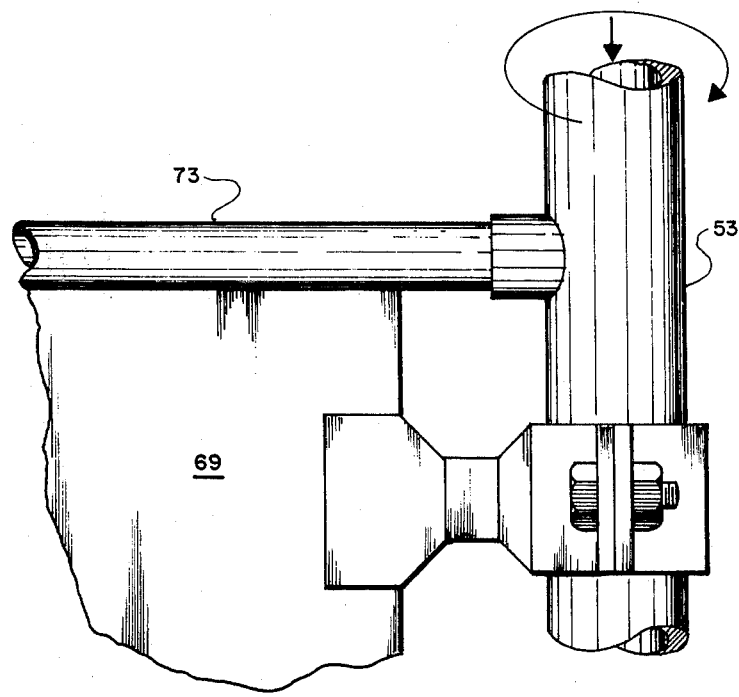
FIG. 3 is a cross-sectional view, again enlarged for purposes of clarity, of a detail of the mechanism shown in FIG. 2.

Referring now to FIGS. 2 and 3, each of the flocculating-mixing stages 59–61 include mixing means to stir the liquid therein to provide rapid blending of flocculant solution and feed slurry. In the illustrated embodiment, the mixing means is a set of radially-extending mixing blades 69 fixed to the drive shaft 53 for rotation therewith. Also mounted within each of the flocculating-mixing stages is means to introduce a chemical flocculating reagent; in the illustrated embodiment, the shaft 53 is shown as being hollow and it carries the flocculating reagent in liquid form for introduction to the respective flocculating-mixing stages 59–61 via radially-extending reagent-dispersing pipes 73. In the embodiment in FIG. 2, the reagent is supplied through the shaft 53 from a reservoir, not shown, via a supply conduit 75. In operation, the reagent liquid is discharged through the dispersing pipes 73 upon rotation of the mixing blades 69. The presence of the reagent and the blending action effectuated by the mixing blades 69 serves to cause the solids in suspension in feed liquor to aggregate and form flocs. Typical dosages when polymer-type flocculants are used are about 10–30 ppm.

In the preferred embodiment and as shown in FIG. 2, a plurality of thin baffle plates 77 are vertically mounted at spaced-apart positions within at least some of the flocculating-mixing stages. The purpose of the baffles 77 is to assist in the flocculating action and to prevent disruptive vortexes or swirls from being established in the flocculating-mixing stages. Typically, four baffles are provided per flocculating-mixing stage, but this is a matter of choice.

In summary to this point, the interior of the tubular column 23 can be understood to comprise three zones: a zone for receiving the stream of feed liquor, a subadjacent dilution zone for receiving clarified liquid for diluting the stream of feed liquor, and a zone comprising a plurality of subadjacent flocculating-mixing stages in which downwardly flowing diluted feed liquor is mechanically mixed with a chemical flocculating reagent. The number of flocculating stages employed is dependent upon the feed rate and flocculation time required by a particular slurry. In some instances, the flocculating-mixing stages need not be immediately adjacent one another, but can be separated by a compartment which does not contain a set of mixing blades.

With reference again to FIG. 2, at least one outlet port 79 is formed through the sidewall of the column 23 at or below the lowermost flocculating-mixing stage. Through this outlet port, the diluted and flocculated feed liquor is discharged into the thickening tank proper and, more particularly, said port is positioned so that the liquor is discharged therefrom directly into the pulp blanket within the liquid body held in the thickening tank. The term pulp blanket herein refers to a stratum of thickened pulp which extends from the bottom of the thickening tank to some variable level below the tank surface; some workers in this art would also term this the sludge compaction zone. In typical situations, the interface between the pulp blanket and the clarified liquid stratum in the tank is remarkably well defined and can be readily determined by means of conventional sludge level detectors, say of the ultrasonic type. At this juncture it should be appreciated that conventional practice in this art suggests that the feed liquor should be introduced high in the clarified liquid stratum, not into the pulp blanket where the influx might disturb the thickening process; in other words, the introduction of feed liquor into the pulp blanket eliminates the so-called free-settling stratum which typically is found in thickening devices. Although it is within the scope of this invention to introduce the feed liquor into the thickening tank proper at a location immediately above the pulp blanket, it is much preferred to make such introduction directly into the pulp blanket as discussed above.

Referring again to the liquid-holding tank shown in FIG. 1., the tank preferably includes a plurality of inclined plate members 81 mounted at generally regular intervals peripherally along the sidewall 11 of the thickening tank at least partially within the normal stratum of the sludge blanket. More particularly, the plate members 81 are mounted to extend upward at an angle of about 50° to about 60° from horizontal and, preferably, at an angle of 55°. The inclined plates can be mounted at spaced-apart intervals as shown or can be placed more closely together in overlapping relationship. The purpose of the inclined plate members 81 is to provide stabilization of the level of the sludge blanket stratum without the necessity of precise control of flocculant dosage or underflow pumping rates. With the aforedescribed discharge of diluted and flocculated liquor directly into the sludge blanket, the level of the sludge blanket becomes very sensitive to changes in feed rate, dilution ratio, and degree of flocculation. When such conditions suddenly change, the sludge blanket is apt to either rise toward the surface of the liquid-holding tank or to drop below the outlet port 79, neither which action is desirable. However, when the aforementioned inclined plates 81 are utilized, the sludge blanket level remains remarkably stable over a wide range of feed rates without requiring continuous control of the flocculant dosage or underflow pumping rate. The absence of substantial fluctuations in the level of the sludge blanket seems to be due to the increase in physical settling area provided by the inclined plates. In practice, the sludge blanket level has been found to fluctuate only two to three inches when the inclined plates 81 are utilized whereas, without the inclined plates, the level of the sludge blanket fluctuated the full depth of the sidewall 11 of the liquid-holding tank.

In the FIG. 1 embodiment, the inclined plates 81 are mounted such that the arms of the raking mechanism 37 pass beneath the bottom edges of the inclined plates. This positioning of the inclined plates 81 is believed to provide an "unloading" action according to which the raking arms remove accumulations of sludge from the areas between the inclined plates. The result is increased underflow density.

In one test of the aforedescribed sedimentation machine incorporating the inclined plates 81 versus the machine without the plates, the underflow density in terms of percent weight solids doubled from 12% to 24%. In that test, the inclined plates were constructed so as to increase the settling surface area in the tank by 120%; the phrase "settling surface area" in this context means the projected area of the inclined plates onto a horizontal plane and is compared to the horizontal expanse of the tank floor. With the addition of the inclined plates, the capability of the tank to handle influent liquor per unit of tank volume was consequently increased by about 270%.

In comparison to a conventional thickening device, pilot tests indicate that the aforedescribed sedimentation machine should provide superior results. For example, a typical thickener for coal refuse can be loaded at only about 0.05 to 0.1 tons per day per square foot of thickener floor area; tests on the aforedescribed machine indicated satisfactory thickening with loadings from 0.8 to 1.0 tons per day per square foot of thickener area. This is with typical underflow concentrations of 30-40% solids by weight and clarified effluents containing 100-300 ppm of suspended solids.

As an alternative embodiment, not shown, a second set of inclined plates can be mounted at generally regular intervals peripherally about the sidewall 11 of the thickening tank above the aforedescribed set of inclined plates 81; in this alternative embodiment, the second set of plates would be mounted above the level of the pulp blanket and would have the purpose and effect of settling out discrete particles or flocs which escape upward from the pulp blanket zone.

As another alternative embodiment, the tubular column 23 could be mounted for rotation within the liquid-holding tank, instead of being stationarily mounted as hereinbefore described.

I claim:

1. A machine for continuously separating suspended solids from a feed stream liquor by gravity settling comprising:
   a. a liquid-holding tank for containing a body of liquid in generally quiescent condition;
   b. an upstanding tubular column mounted within said liquid-holding tank;
   c. means mounted at the upper end of said tubular column to convey a stream of feed liquor into the interior of said tubular column;
   d. flocculating-mixing compartments formed within said tubular column, one below another, to sequentially receive the feed liquor;
   e. mixing means mounted within each of said flocculating-mixing compartments to blend the liquid therein;
   f. reagent introduction means mounted within each of said flocculating-mixing compartments to disperse a chemical flocculating reagent into the compartment for enhancing the flocculation of suspended solids within the feed liquor;
   g. discharge means in liquid-flow communication with the lowermost one of said flocculating-mixing compartments and with the interior of said liquid-holding tank for discharging the flocculated feed liquor into a pulp blanket stratum at the bottom of said liquid-holding tank;
   h. raking means including rake arms mounted within said liquid-holding tank to urge solids settled in the pulp blanket stratum to underflow discharge; and
   i. overflow means mounted on said liquid-holding tank to remove clarified supernatant therefrom.

2. A machine according to claim 1 further including dilution means mounted in communication with the interior of said tubular column to admit clarified liquid into said tubular column from a stratum of supernatant liquid held within said tank for addition to the feed stream liquor.

3. A machine according to claim 2 further including impeller means mounted within said tubular column in communication with said dilution means to draw the clarified liquid into said column and to impel the same downward for mixing with the feed stream liquor.

4. A machine according to claim 1 further including vertically-extending plate members mounted at intervals peripherally along the sidewall of said liquid-holding tank immediately above the bottom of said tank.

5. A machine according to claim 4 wherein said plate members are mounted to extend upward at an angle of from about 50° to about 60° from horizontal.

6. A machine according to claim 4 wherein said plate members are mounted to extend upward at an angle of 55° from horizontal.

7. A machine according to claim 4 wherein said plate members are mounted so that the rake arms pass beneath their bottom edges.

8. A machine according to claim 4 wherein said plate members are all mounted at substantially the same elevation within said liquid-holding tank to comprise a first set.

9. A machine according to claim 8 further including a second set of vertically-extending plate members mounted at intervals peripherally along the sidewall of said liquid-holding tank to extend above the level of the pulp blanket stratum.

10. A machine according to claim 1 wherein said tubular column is stationarily mounted within said liquid-holding tank.

11. A machine according to claim 1 wherein said tubular column is mounted for rotation within said liquid-holding tank.

12. A machine according to claim 1 wherein said means mounted at the upper end of the tubular column comprises an annular feedwell to receive a stream of feed liquor and means in liquid-flow communication between the interior of said feedwell and tubular column to convey feed liquor into said tubular column.

13. A machine according to claim 12 wherein said annular feedwell is structurally connected to said raking mechanism to rotate therewith about the tubular column.

14. A machine according to claim 2 wherein said dilution means includes a pump means mounted within said tubular column to draw the clarified supernatant liquid into said column and to impel that liquid downward within said tubular column for mixing with, and dilution of, said feed liquor.

15. A machine according to claim 14 further including a drive shaft which is mounted to extend downward through said tubular column and which is coupled to said pump means to drive the same.

16. A machine according to claim 1 wherein at least one of said flocculating-mixing compartments is defined, at its respective upper and lower ends, by annular baffle plates which are fixed horizontally to the interior wall of the tubular column and wherein the center openings in said annular baffle plates are of sufficient size to permit the flow of diluted feed liquor into and then out of the flocculating-mixing compartment.

17. A machine according to claim 1 wherein said mixing means comprises a set of radially-extending mixing blades and a drive shaft which is mounted to extend downward through said tubular column to rotatably drive said mixing blades.

18. A machine according to claim 17 wherein said drive shaft is hollow and is connected to carry chemical flocculating reagent to said flocculating-mixing compartments.

19. A machine according to claim 18 wherein said reagent introduction means comprises radially extending pipe members connected to said hollow drive shaft to rotate therewith to disperse chemical flocculent reagent therefrom into the respective flocculating-mixing compartments.

20. A machine according to claim 1 further including thin baffle plates vertically mounted within at least one of said flocculating-mixing compartments.

21. An improved process for continuously separating suspended solids from a feed stream liquor by gravity settling comprising the following steps:
 a. introducing feed stream liquor into a first zone in liquid flow communication with a liquid-holding tank which holds a body of liquid in generally quiescent condition;
 b. then diluting the feed stream liquor with clarified liquid from a stratum of supernatant liquid held within the liquid-holding tank;
 c. then passing the diluted feed liquor through a plurality of subadjacent stages and, in each of said stages, dispersing chemical flocculating reagent into the diluted feed liquor and mechanically mixing the liquor and reagent to promote the aggregation of suspended particles into flocs;
 d. then discharging the flocculted and diluted feed stream directly into a pulp blanket stratum formed at bottom of the liquid-holding tank proper;
 e. removing settled pulp from the liquid-holding tank; and
 f. removing a clarified supernatant from the liquid-holding tank.

* * * * *

REEXAMINATION CERTIFICATE (632nd)
United States Patent [19]
Emmett, Jr.

[11] B1 4,055,494
[45] Certificate Issued  Feb. 10, 1987

[54] THICKENING DEVICE AND METHOD

[75] Inventor: Robert C. Emmett, Jr., Salt Lake City, Utah

[73] Assignee: Envirotech Corporation, Menlo Park, Calif.

Reexamination Request:
No. 90/000,872, Oct. 4, 1985

Reexamination Certificate for:
Patent No.: 4,055,494
Issued: Oct. 25, 1977
Appl. No.: 768,315
Filed: Feb. 14, 1977

[51] Int. Cl.⁴ .......................... B01D 21/01; C02F 1/56
[52] U.S. Cl. .................................. 210/715; 210/199; 210/208; 210/519; 210/738
[58] Field of Search ........ 210/199, 207, 208, 519–522, 210/723–728, 738, 802, 805

[56] References Cited

U.S. PATENT DOCUMENTS

| | | | |
|---|---|---|---|
| 1,030,366 | 6/1912 | Winters | 210/207 |
| 1,400,622 | 2/1920 | Nordell | 210/788 |
| 1,940,585 | 12/1933 | Fauth | 210/199 |
| 2,151,261 | 3/1939 | Bartlett | 210/199 |
| 2,227,099 | 12/1940 | Mallory | 210/714 |
| 2,274,361 | 2/1942 | Darby | 210/738 |
| 2,295,714 | 9/1942 | Clark | 210/208 |
| 2,440,514 | 4/1948 | Karlstrom | 210/199 |
| 2,678,730 | 5/1954 | Coulten | 210/738 |
| 2,881,922 | 4/1959 | Kelly | 210/520 |
| 3,006,474 | 10/1961 | Fitch | 210/776 |
| 3,067,878 | 12/1962 | Genter | 210/521 |
| 3,087,890 | 4/1963 | Pye | 210/712 |
| 3,227,650 | 1/1966 | Bell | 210/727 |
| 3,313,725 | 4/1967 | Tsuda et al. | 210/20 |
| 3,314,527 | 4/1967 | Kivall | 210/520 |
| 3,338,827 | 8/1967 | Mavsolt | 210/713 |
| 3,349,030 | 10/1947 | Savage | 210/713 |
| 3,353,676 | 11/1967 | Hirsch | 210/197 |
| 3,410,413 | 11/1968 | Fechter | 210/519 |
| 3,460,678 | 8/1969 | Condolios | 210/520 |
| 3,482,704 | 12/1969 | Jablon | 210/519 |
| 3,523,889 | 8/1970 | Eis | 210/20 |
| 3,532,218 | 10/1970 | Von Blottnitz | 210/207 |
| 3,545,620 | 12/1970 | Thorn | 210/208 |
| 3,615,025 | 10/1971 | Rice | 210/521 |
| 3,635,346 | 1/1972 | Zuckerman | 210/208 |
| 3,660,284 | 5/1972 | Camp | 210/726 |
| 3,770,131 | 11/1973 | Davis | 210/519 |
| 3,779,910 | 12/1973 | Chatfield | 210/208 |
| 3,892,666 | 7/1975 | Quast | 210/520 |
| 3,929,640 | 12/1975 | Dohnert | 210/207 |
| 3,951,806 | 4/1976 | Young | 210/208 |
| 4,054,514 | 10/1977 | Oltmann | 210/715 |

FOREIGN PATENT DOCUMENTS 589628  6/1947  United Kingdom ............... 210/521

OTHER PUBLICATIONS

John T. Burke; Questions and Answers to Improve Water Clarification; Industrial Water & Wastes, May/Jun. 1962.
D. E. Ash; 3–page article entitled "Short–Detention–Time Clarifier Boosts Sludge–Processing Results for British Sugar Factory" appearing in Filtration Engineering, Jan./Feb. 1973.
A. A. Terchick et al.; 4–page article entitled "Application and Utilization of the Enviro-Clear Thickener in a U.S. Steel Coal Preparation Plant" reprinted from Transactions of SME, Jun., 1975, vol. 258.
Nicholas P. Chironis; 7–page article entitled "New clarifier/thickener boosts output of older coal preparation plant" reprinted from Coal Age, Jan. 1976.
Water Conditioning Handbook, The Permutit Company, New York, 1954, pp. 13/1–13/5.
Prager, "The Sludge Blanket Clarifier", Water and Sewage Works, vol. 97, No. 4, Apr. 1950.
"American" Flocsettler, The American Well Works, Aurora Illinois, TS–550, 1950.

*Primary Examiner*—Ernest G. Therkorn

[57] ABSTRACT

A machine is disclosed for separating solids from feed liquor by gravity settling to form thickened subnatant. The machine includes a liquid-holding tank having an upstanding tubular-column mounted therein for receiving the feed liquor. An inlet is formed in the upper portion of the column to admit clarified supernatant into the column for mixing with, and dilution of, the feed liquor. A plurality of subadjacent compartments include reagent introduction and mixing means to receive the feed liquor and to mix a chemical flocculating reagent thereinto. At the bottom of the column is an outlet to discharge the flocculated liquor directly into a pulp blanket stratum established within the tank.

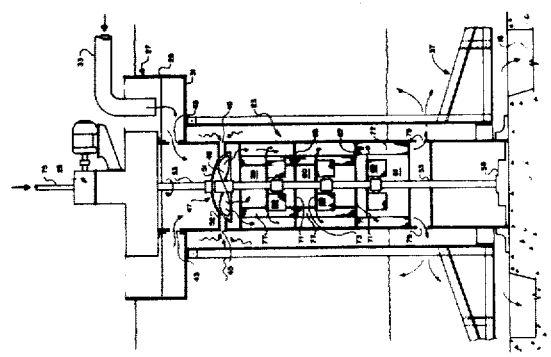

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-21 are cancelled.

New claims 22-40 are added and determined to be patentable.

22. *Apparatus for continuously separating suspended solids from a feed stream liquor by gravity settling comprising:*
   (a) *a liquid holding tank for containing a body of liquid in generally quiescent condition;*
   (b) *a tubular column mounted within said liquid holding tank extending generally vertically therein;*
   (c) *means for introducing feed liquor into the interior of said tubular column at the upper end of the column;*
   (d) *annular baffle means extending generally horizontally around the tubular column on the inside of the column dividing the column interiorly into a plurality of mixing compartments, one below another, for sequentially receiving the feed liquor, said baffle means being centrally open for downward flow of said liquor through said compartments;*
   (e) *a shaft extending down through the column and centrally through the baffle means;*
   (f) *means for driving the shaft;*
   (g) *mixing means on the shaft in each compartment, rotatable with the shaft for stirring the downwardly flowing liquor;*
   (h) *means for introducing a flocculating reagent into each of said compartments as the liquor is flowing downwardly through the compartments, the flocculating agent introduced into each compartment being mixed therein with the downwardly flowing liquor for enhancing the flocculation of suspended solids in the liquor;*
   (i) *the tubular column having means for preventing swirls from being established in said compartments;*
   (j) *the lowermost of said compartments being in discharge communication with the interior of said tank for discharging the flocculated feed liquor from the column into a sludge stratum in the tank;*
   (k) *raking means in said tank to urge solids settled in the tank to underflow discharge; and*
   (l) *overflow means mounted on the tank for removal of clarified supernatant from the tank.*

23. *Apparatus as set forth in claim 22 further including dilution means mounted in communication with the interior of said tubular column to admit clarified liquid into said tubular column from a stratum of supernatant liquid held within said tank for addition to the feed stream liquor.*

24. *Apparatus as set forth in claim 23 further including impeller means mounted within said tubular column in communication with said dilution means to draw the clarified liquid into said column and to impel the same downward for mixing with the feed stream liquor.*

25. *Apparatus according to claim 22 further including vertically-extending plate members mounted at intervals peripherally along the sidewall of said liquid-holding tank immediately above the bottom of said tank.*

26. *Apparatus as set forth in claim 25 wherein said plate members are mounted to extend upward at an angle of from about 50° to about 60° from horizontal.*

27. *Apparatus as set forth in claim 25 wherein said plate members are mounted to extend upward at an angle of 55° from horizontal.*

28. *Apparatus as set forth in claim 25 wherein said plate members are mounted so that the raking means passes beneath their bottom edges.*

29. *Apparatus as set forth in claim 25 wherein said plate members are all mounted at substantially the same elevation within said liquid-holding tank to comprise a first set.*

30. *Apparatus as set forth in claim 29 further including a second set of vertically-extending plate members mounted at intervals peripherally along the sidewall of said liquid-holding tank to extend above the level of the pulp blanket stratum.*

31. *Apparatus as set forth in claim 22 wherein said tubular column is stationarily mounted within said liquid-holding tank.*

32. *Apparatus as set forth in claim 22 wherein said tubular column is mounted for rotation within said liquid-holding tank.*

33. *Apparatus as set forth in claim 22 wherein said means for introducing feed liquor into the interior of said tubular column comprises an annular feed well mounted at the upper end of said column for receiving a stream of feed liquor and means in liquid-flow communication between the interior of said feed well and tubular column to convey feed liquid into said tubular column.*

34. *Apparatus as set forth in claim 33 wherein said annular feed well is structurally connected to said raking means to rotate therewith about the tubular column.*

35. *Apparatus as set forth in claim 23 wherein said dilution means comprises pump means on said drive shaft within said tubular column to draw the clarified supernatant liquid into said column and to impel that liquid downward within said tubular column for mixing with, and dilution of, said feed liquor.*

36. *Apparatus as set forth in claim 22 wherein each said mixing means comprises a set of blades extending radially from said drive shaft.*

37. *Apparatus as set forth in claim 36 wherein said drive shaft is hollow and is connected to carry said flocculating reagent to said compartments.*

38. *Apparatus as set forth in claim 37 wherein said reagent introduction means comprises pipe members extending radially from said hollow drive shaft and rotatable therewith for dispensing the reagent therefrom into the respective compartments.*

39. *Apparatus as set forth in claim 22 wherein the means for preventing swirls comprises thin baffle plates vertically mounted within the compartments.*

40. *A process for continuously separating suspended solids from a feed stream liquor by gravity settling comprising:*
   (a) *introducing feed stream liquor into a first zone in liquid flow communication with a liquid-holding tank which holds a body of liquid in generally quiescent condition;*

(b) then diluting the feed stream liquor with clarified liquid from a stratum of supernatant liquid held within the liquid-holding tank;

(c) then passing the diluted feed liquor in a continuous stream through a plurality of subjacent compartments which are in restricted communication, within the tank;

(d) in each of said compartments dispensing chemical flocculating reagent into the diluted feed liquor and mechanically mixing the liquor and reagent as the liquor flows downwardly to promote the aggregation of suspended particles into flocs;

(e) then discharging the flocculated and diluted feed stream after passage through the lowermost of said compartments directly into a stratum of sludge in the liquid-holding tank adjacent the bottom of the tank proper;

(f) removing settled material from the liquid-holding tank; and (g) removing a clarified supernatant from the liquid-holding tank.

* * * * *